United States Patent
Berseth et al.

(10) Patent No.: US 10,586,133 B2
(45) Date of Patent: Mar. 10, 2020

(54) SYSTEM AND METHOD FOR PROCESSING CHARACTER IMAGES AND TRANSFORMING FONT WITHIN A DOCUMENT

(71) Applicant: Scribe Fusion, LLC, Jacksonville, FL (US)

(72) Inventors: Matthew Thomas Berseth, Ponte Vedra, FL (US); Robert Jackson Marsh, Ponte Vedra Beach, FL (US)

( * ) Notice: Subject to any disclaimer, the term of this patent is extended or adjusted under 35 U.S.C. 154(b) by 0 days.

(21) Appl. No.: 16/383,514

(22) Filed: Apr. 12, 2019

(65) Prior Publication Data
US 2020/0026970 A1 Jan. 23, 2020

Related U.S. Application Data

(60) Provisional application No. 62/702,256, filed on Jul. 23, 2018.

(51) Int. Cl.
*G06K 9/68* (2006.01)
*G06K 9/34* (2006.01)
*G06F 17/21* (2006.01)

(52) U.S. Cl.
CPC ......... *G06K 9/6835* (2013.01); *G06F 17/214* (2013.01); *G06K 9/344* (2013.01); *G06K 9/6828* (2013.01); *G06K 2209/01* (2013.01)

(58) Field of Classification Search
None
See application file for complete search history.

(56) References Cited

U.S. PATENT DOCUMENTS 5,212,739 A * 5/1993 Johnson .................. G06K 9/48
382/177
6,400,845 B1 * 6/2002 Volino ................ G06K 9/2054
358/462
(Continued)

FOREIGN PATENT DOCUMENTS

CN 103996239 B * 8/2016 ............. G06K 9/186

OTHER PUBLICATIONS

Kluzner, Vladimir, et al. "Hybrid approach to adaptive OCR for historical books." 2011 International Conference on Document Analysis and Recognition. IEEE, 2011. (Year: 2011).*
(Continued)

*Primary Examiner* — Michelle M Entezari
(74) *Attorney, Agent, or Firm* — Wilson Dutra, PLLC; Camille A. Wilson

(57) ABSTRACT

The present disclosure relates to a system and method to transform character images from one representation to another representation. According to some embodiments of the present disclosure, a form may be processed to separate background data from content data, wherein character images from one or both the background data and the content data may be transformed. In some aspects, one or both handwritten font and type font may be processed in the character images, wherein the original fonts may be transformed into a uniform type font. In some embodiments, the character images may be translated to their correct state, wherein the translation may occur before or after the transformation. In some implementations, the translation and font transformation may allow for more efficient and effective character recognition.

19 Claims, 8 Drawing Sheets

(56) References Cited

U.S. PATENT DOCUMENTS

| | | | | |
|---|---|---|---|---|
| 8,054,971 | B2* | 11/2011 | Weiner | H04M 1/72552 380/229 |
| 8,494,275 | B2* | 7/2013 | Kitada | G06K 9/00174 382/161 |
| 2003/0130992 | A1* | 7/2003 | Tyan | G06K 9/00476 |
| 2003/0210428 | A1* | 11/2003 | Bevlin | G06K 9/2063 358/1.18 |
| 2004/0136570 | A1* | 7/2004 | Ullman | G06T 5/004 382/114 |
| 2007/0160309 | A1* | 7/2007 | Bertozzi | G06T 5/005 382/266 |
| 2010/0074509 | A1* | 3/2010 | Laaser | G06K 9/03 382/138 |
| 2010/0082709 | A1* | 4/2010 | Yamamoto | G06F 16/93 707/812 |
| 2010/0246999 | A1* | 9/2010 | Tillberg | G06K 9/00442 382/309 |
| 2011/0258195 | A1* | 10/2011 | Welling | G06K 9/00442 707/740 |
| 2018/0114088 | A1* | 4/2018 | Tanaka | G06K 9/344 |

OTHER PUBLICATIONS

Machine Translation of CN 103996239 B (Year: 2016).*
Yefeng Zheng, Huiping Li, David Doermann, A Model-based Line Detection Algorithm in Documents, Proceedings of the Seventh International Conference on Document Analysis and Recognition, 2003, pp. 44-48, Proceedings, IEEE, USA.
Bin Yu, Anil K Jain, A generic system for form dropout, IEEE Transactions on Pattern Analysis and Machine Intelligence, Nov. 1996, pp. 1127-1134, 18(11), IEEE, USA.
David Alvarez, Ramón Fernández, Lidia Sánchez, Stroke-based intelligent word recognition using a formal language, 10th International Conference on Soft Computing Models in Industrial and Environmental Applications, 2015, pp. 101-110, Springer, Cham.
Sameneh Azadi, Matthew Fisher, Vladimir G Kim, Zhaowen Wang, Eli Shechtman, Trevor Darrell, Multi-content GAN for few-shot font style transfer, Proceedings of the IEEE Conference on Computer Vision and Pattern Recognition, 2018, pp. 7564-7573, IEEE.
Ankan Kumarbhunia, Ayan Kumarbhunia, Prithaj Banerjee, Aishik Konwer, Abir Bhowmick, Partha Pratim Roy, Umapada Pal, Word Level Font-to-Font Image Translation using Convolutional Recurrent Generative Adversarial Networks, 24th International Conference on Pattern Recognition (ICPR), Aug. 20 2018, pp. 3645-3650, IEEE.
Gantugs Atarsaikhan, Brian Kenji Iwana, Atsushi Narusawa, Keiji Yanai, Seiichi Uchida, Neural font style transfer, 14th IAPR International Conference on Document Analysis and Recognition (ICDAR), 2015, pp. 51-56, vol. 5, IEEE, USA.
Chris Tensmeyer, Daniel Saunders, Tony Martinez, Convolutional neural networks for font classification, 14th IAPR International Conference on Document Analysis and Recognition (ICDAR), 2017, pp. 985-990, vol. 1, IEEE, USA.

* cited by examiner

FIG. 1

210
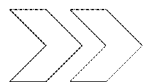
215
220
225
230
235
FIG. 2

310
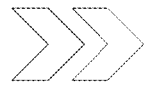
315
320
325
330
335
340
345
FIG. 3

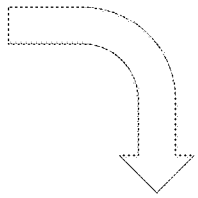
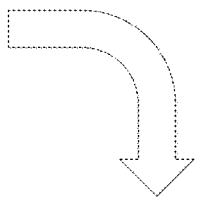
FIG. 6

FIG. 7A

PART III MARITAL INFORMATION

| 11. Marital Status (Check one or more) | ☐ Never Been Married  ☐ Divorced | (⊙ ☐ Separated  ☐ Re-married) | |
|---|---|---|---|
| 12. Name of Present Spouse | (First, Middle, Last Name) | Age | Date of Birth  760 |
| 13. Other names spouse has used | Place of Marriage  (⊙ DAYTON, Ohio) | | Date of Marriage |
| 14. Spouse's Address if different than Applicant's  (⊙) | | | |
| 15. Spouse's Employer's Name and Address, Include Zip Code  720 | | Area Code/Telephone Number  (⊙ 937 947 1830)  770 | Hours During Employment |

PART III MARITAL INFORMATION

| 11. Marital Status (Check one or more) | ☐ Never Been Married  ☐ Divorced | ☒ Separated  ☐ Re-married | |
|---|---|---|---|
| 12. Name of Present Spouse  JANE DOE | (First, Middle, Last Name) | Age | Date of Birth  07.02.1962 |
| 13. Other names spouse has used | Place of Marriage  DAYTON, OHIO | | Date of Marriage |
| 14. Spouse's Address if different than Applicant's  712162 VICTORY DR | | | |
| 15. Spouse's Employer's Name and Address, Include Zip Code | | Area Code/Telephone Number  937 947 1830 | Hours During Employment |

780

SYSTEM AND METHOD FOR PROCESSING CHARACTER IMAGES AND TRANSFORMING FONT WITHIN A DOCUMENT

CROSS-REFERENCE TO RELATED APPLICATION

This application claims priority to and the full benefit of U.S. Provisional Patent Application Ser. No. 62/702,256, filed Jul. 23, 2018, and titled "SYSTEM AND METHOD FOR PROCESSING CHARACTER IMAGES AND TRANSFORMING FONT WITHIN A DOCUMENT", the entire contents of which are incorporated in this application by reference.

BACKGROUND OF THE DISCLOSURE

Optical character recognition (OCR) is technology designed to facilitate recognition of characters and letters. OCR allows for the electronic conversion of images of handwritten, printed, or typed text into machine-encoded text. Since OCR relies so heavily on interpreting text, the fonts, characters, and their respective sizes used in a source document plays an integral role in the OCR process. These technologies commonly misinterpret characters or confuse one character for another, particularly when the technology needs to distinguish between characters that look similar. For example, an OCR engine may have difficulty distinguishing between the letter O from the number 0, or a lowercase "L" from an uppercase "I."

Traditionally, OCR devices would read input from printers acting as a data processing device. These data processing devices were only able to analyze specific fonts provided by the printer. OCR fonts were eventually created to optimize the scanning process from different devices. OCR-A was a sans-serif font standardized by the American National Standards Institute (ANSI) that initially used a fixed width monospaced font for printers to use. Though OCR-A was meant to be easy to read for machines, the font was hard for the human eye to read. OCR-B was another monospace sans-serif font created to facilitate OCR for specific electronic devices, originally used for financial and bank-oriented uses. OCR-B is slightly easier for the human eye to read.

However, the use of these fonts still depended on a variety of factors for an optimal scan, such as font, size, color, contrast, brightness, density of content, text placement, and font spacing. Dots per inch (DPI) may also be another factor to consider with respect to character placement.

Intelligent character recognition (ICR) is often used as a recognition system that enables a computer to recognize machine print or handwritten characters. ICR is often considered to be a more advanced OCR capability. Some ICR software may include a machine learning system that can identify handwriting patterns. Form design may influence the accuracy capabilities of ICR systems, making recognition easier on some forms. For example, boxes are often used on forms to constrain handwriting, encouraging uniform sizing and separation of characters.

Whether it is machine print or handwriting, recognition methods today are achieving lower than desired results. Current recognition systems may work well in very limited scenarios. The variations observed in real world documents are not well handled by existing OCR/ICR systems. If the recognition process has difficulty distinguishing or knowing the original fonts or characters, the end product may not reflect what was in the original source. Ideally, incoming documents would be structured in a manner that is optimized for the recognition system.

SUMMARY OF THE DISCLOSURE

What is needed is a system and method to transform character images from one representation to another representation. Transforming character images may allow for producing more legible representations of the character images and may allow for translation of the character image to a location that may increase the recognition accuracy of the character images. This may include font to font or handwriting to font transformation. For example, the system may convert handwriting to font, font A to font B, or image A to image B.

In some embodiments, the system may use content around an image to determine context. In some implementations, the system may scan a variety of character types, such as handwriting, font A, and font B, and normalize those characters. In some aspects, the system may scan a variety of character types, such as handwriting, font A, and font B, and convert them to font C.

In some embodiments, the system may identify what elements are tied to data portions in a form so that elements may be moved to where they should be. In some implementations, the system may determine how to assign data elements to specific fields. In some aspects, the system may determine correct image placement without generating a new image. In some embodiments, the system may understand misplaced images and assign to a correct data field. In some implementations, the system may determine that an image is improper and generate a more appropriate image. In some aspects, the system may generate electronic data to inform of proper placement. In some embodiments, the system may store relationship information without creating a second image.

According to some embodiments of the present disclosure, a form may be processed to separate background data from content data, wherein character images from one or both the background data and the content data may be identified. In some aspects, one or both handwritten font and type font may be processed in the character images, wherein the original fonts may be transformed into a uniform type font. In some implementations, the font may allow for more efficient and effective character recognition.

In some aspects, the present disclosure relates to a process for processing character images within a form, the process comprising the process steps of: receiving a form with data; analyzing the form and data through an artificial entity; identifying a plurality of character image elements within the data without requiring recognition of character images comprising the plurality of character image elements; and transforming at least a portion of the plurality of character image elements.

Implementations may comprise one or more of the following features. In some embodiments, the process may further comprise the process step of inpainting missing character image elements, wherein the inpainting may increase the legibility of a character image comprising at least a portion of missing character image elements. In some implementations, the process may further comprise the process step of identifying at least a portion of the plurality of character image elements as one or more of content data, background data, and noise.

In some embodiments, the process may further comprise the process step of mapping relative locations of each of the plurality of character image elements within the form. In some implementations, the process may further comprise the process step of identifying correct relative locations of content data and background data, wherein correct relative locations of content data and background data may increase effectiveness of recognition. In some aspects, the process may further comprise the process step of translating at least a portion of the plurality of character image elements. In some embodiments, translating may comprise shifting at least a portion of the plurality of character image elements to correct relative locations within the form.

In some aspects, the process may further comprise the process steps of: removing content data from the form; and repopulating the content data with transformed character image elements. In some implementations, a plurality of character images may comprise one or both a handwritten font or a typed font, wherein the plurality of character images may comprise at least a portion of the character image elements. In some embodiments, the process may further comprise the process step of identifying handwritten font and typed font. In some aspects, the identifying may create separable layers that, when separate, may allow for increased recognition of at least a portion of one or both background data and content data.

In some embodiments, transforming may change at least a portion of the plurality of character image elements to one or more predefined transformed fonts. In some implementations, one or more predefined transformed fonts may increase accuracy of character recognition. Implementations of the described techniques may comprise hardware, a method or process, or computer software on a computer-accessible medium.

In some aspects, the present disclosure relates to a process for processing character images within a form, the process comprising the process steps of: receiving a form with data; analyzing the form and data through an artificial entity; identifying a plurality of character image elements within the data without requiring recognition of character images comprising the plurality of character image elements. In some embodiments, the process may comprise translating at least a portion of the plurality of character image elements.

Implementations may comprise one or more of the following features. In some aspects, the process may further comprise the process step of identifying at least a portion of the plurality of character image elements as content data, background data, or both. In some implementations, translating may map relative locations of each of the plurality of character image elements within the form. In some embodiments, translating may identify correct relative locations of content data and background data, wherein correct relative locations of content data and background data increase effectiveness of recognition.

In some aspects, translating may shift at least a portion of the plurality of character image elements to correct relative locations within the form. In some embodiments, the process may further comprise the process steps of: removing content data from the form; and repopulating the content data with translated character image elements. In some implementations, the process may further comprise the process step of transforming at least a portion of the plurality of character image elements. Implementations of the described techniques may comprise hardware, a method or process, or computer software on a computer-accessible medium.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, may cause the apparatus to perform the actions. In some aspects, corresponding computer systems, apparatus, and computer programs recorded on one or more computer storage devices, may be configured to perform the actions of the methods.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 1 illustrates a set of exemplary font transformations, according to some embodiments of the present invention.

FIG. 2 illustrates a set of exemplary font transformations, according to some embodiments of the present invention.

FIG. 3 illustrates a set of exemplary font transformations, according to some embodiments of the present invention.

FIG. 6 illustrates an exemplary form enhancement process, according to some embodiments of the present invention.

FIG. 7A illustrates an exemplary font transformation, according to some embodiments of the present invention.

FIG. 7B illustrates an exemplary font transformation, according to some embodiments of the present invention.

DETAILED DESCRIPTION

Figures 4A, 4B, 5A, 5B:
FIG. 4A illustrates an exemplary font transformation, according to some embodiments of the present invention.
FIG. 4B illustrates an exemplary font transformation, according to some embodiments of the present invention.
FIG. 5A illustrates an exemplary font transformation, according to some embodiments of the present invention.
FIG. 5B illustrates an exemplary font transformation, according to some embodiments of the present invention.

The present disclosure provides generally for a system and method to identify and process individual character images without requiring recognition of the character image. More specifically, the system may identify how the character is supposed to appear and convert the character to look that way, which may include one or both transforming and translating elements of the character image. In some aspects, the system may visually transform a font or character from one manifestation to another, wherein optical systems may depend on the translated or transformed output more accurately. In some implementations, missing character image elements may be filled in, wherein the inpainting may increase the legibility of a character image comprising at least a portion of missing character image elements. In some embodiments, such as where the optical system may be integrated with the transforming and translating system, generating a new form may not be necessary. Where the transformed and translated data may be processed by a separate optical system, a new form may be populated with the transformed and translated fonts.

The present disclosure provides generally for a system and method to visually transform a character, word, or phrase from one manifestation to another for increased legibility or more accurate digitization. This transformed output may be used by other optical-based systems or directly to a human reader. In some implementations, a system and method may identify positioning relationships. In some aspects, a system and method may use positioning relationships when determining data placement. More specifically, content data may be translated to be more accurately linked to its categorization or data field.

According to some embodiments of the present disclosure, a form may be processed to separate background data from content data, wherein character images from one or both the background data and the content data may be identified. In some aspects, one or both handwritten font and type font may be processed in the character images, wherein the original fonts may be transformed into a uniform type font. In some implementations, the font may allow for more efficient and effective character recognition.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

GLOSSARY

Content Data: as used herein refers to data and information input by a user or system. In some aspects, content data may be inserted based on the background data, such as in response to a prompt on a form or document.

Character Image: as used herein refers to a portion of content data identified as containing characters, symbols, illustrations, graphics, markings, or other notations, as non-limiting examples. In some aspects, the character image may comprise one or both handwritten or typed font. For example, a portion of content may comprise typed font, and a user may make an annotation in handwritten font next to the type font.

Handwritten Font: as used herein refers to characters that may resemble handwriting, in contrast to type font. In some embodiments, handwritten font may not be generated by a user directly writing into a form. For example, some form content may be generated by inserting handwritten content that may have been collected separately, such as through an electronic prompt. In some aspects, handwritten font may comprise handwriting from one or more users. Any examples using handwritten font may also be applied to embodiments with type font.

Type Font: as used herein refers to characters input through a mechanical or digital device, wherein the characters comprise a font typically associated with typing, in contrast to handwritten font. In some implementations, a form may contain one or more type fonts.

Noise: as used herein refers to aberrations on a form that does not comprise background data or content data.

Dropout: as used herein refers to a removal of background data, wherein the remaining data may comprise content data. In some aspects, the dropout may occur after a removal of noise, which may allow for a more precise removal of background data.

Data: as used herein refers to extractable information from a form, wherein data may comprise a combination of content data and background data. In some aspects, data may comprise information not yet processed, categorized, or indexed.

Form: as used herein refers to any document comprising background data and content data. In some aspects, forms may comprise one or more paper forms, signs, computer/device screens, labels, and electronic documents (such as word processing documents, portable document format documents, or image files, as non-limiting examples). As non-limiting examples, a form may comprise a tax form, such as a 1095, a financial document, such as a mortgage application, a healthcare form, such as a physician intake form, or an insurance form, such as a claims form. In some aspects, a form may comprise an image with background data and content data. For example, a form may comprise a license plate, wherein the content data may comprise the license plate number and date of expiration and the background data may comprise the state, slogan, and graphic that may indicate the exact type of plate.

User: as used herein refers to any entity that may insert or input content data. In some aspects, a user may comprise an individual who may be inputting content data on behalf of herself or on behalf of another. In some embodiments, a user may comprise an artificial entity, such as software or artificial intelligence. In some implementations, multiple users may contribute to a single form, whether authentic or synthetic. In some aspects, the multiple users may input the data at the same or different times, location, or entities.

Background Data: as used herein refers to data and information on a form that may be universal to that form, such as form prompts and general form information, as non-limiting examples. In some aspects, general form information may comprise form identification, including form numbers or information related to the source, such as the government entity or company providing the form. In some embodiments, general form information may comprise page numbers or disclaimers that may be included with the form. In some implementations, prompts may comprise text or images that indicate to a user what content to insert in which locations on the form, such as name, date, address, or other requested information.

Translate: as used herein refers to processing an image to determine the proper state of the form data and regenerating the image where the form data is in the proper state, wherein translation allows for easier and more accurate legibility of the image. In some aspects, the proper state may include one or more relative location between content data and background data, noise levels within the form data, or relative location within a segment of form data, as non-limiting examples. In some embodiments, translation may include shifting content data to a more optimal location within the background data, such as to place it more accurately within a form field. Translation may include removing noise to allow for more distinct form data. In some implementations, translation may include shifting segments of content or background data to make the individual segment more legible, such as to remove skewing.

Transform: as used herein refers to a process of changing a first image to a second image based on contextual data and image norms. In some aspects, transformation may include changing a first font to a second font. For example, the analysis may identify a stroke within the first image and identify that the particular stroke is typically associated with x stroke location and orientation for the second image. In contrast to traditional font changing technology, transformation may not require the comprehension and processing of the form data, wherein transformation may directly generate a new image. Once transformed, the new image may be more easily processed and read for form data.

Element: as used herein refers to a small unit of an image that may be individually processed, wherein an image refers to any combination of form data and the form. For example, an element may comprise a pixel, super pixel, or voxel, as non-limiting examples. A character image element is defined as an element of a character image, wherein a character image comprises at least one character image element, such as a pixel, super pixel, or voxel.

Category: as used herein refers to tagging or classifying content data and background data based on predefined characteristics and parameters. Categorization refers to assigning a category to at least a portion of the content data or background data. In some aspects, a category may be a general type, such as sensitive or not sensitive or hand input or computer input. Sensitive data may include credit card information, social security numbers, or health information, as non-limiting examples. In some embodiments, a category may be a specific type, such as address, date, insurance code, or VIN, as non-limiting examples. In some implementations, the specific types may be further distinguished, such as identifying a birth date from a form completion date or identifying a health care provider name from a patient name from a guardian's name from a claims adjuster name. In some aspects, categorization may be based on isolated element analysis, context of proximate elements, comparisons of background data to content data, or combinations thereof, as non-limiting examples. In some aspects, background data may be indexed to allow for faster processing, wherein portions of background data may be labeled, such as by form field.

Recognition: as used herein as the classification of a character image. For example, recognition may allow a system to identify a letter as a "t" or an image as a "dog".

Figure 1:
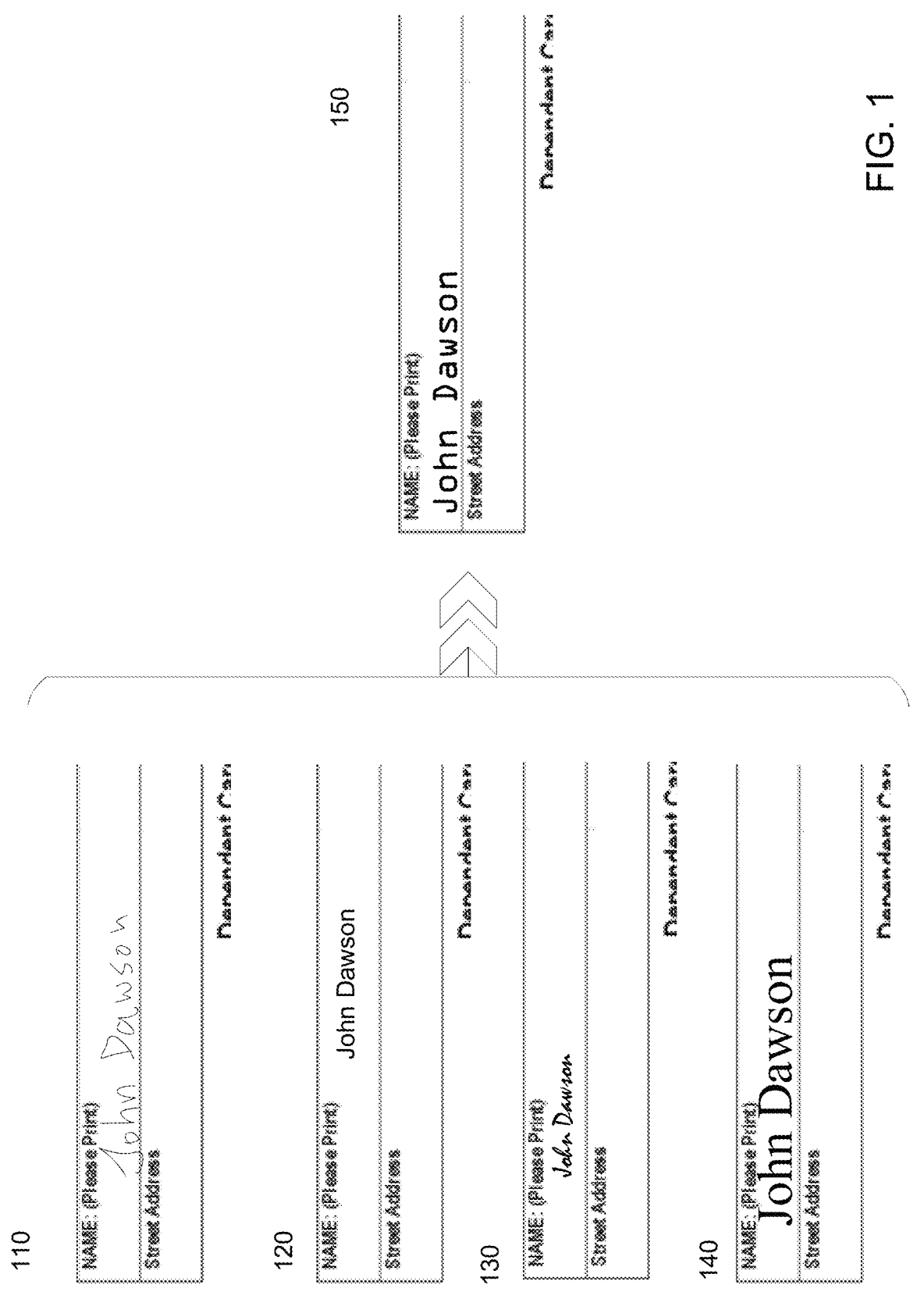

Referring now to FIG. 1, a set of exemplary font transformations is illustrated. In some aspects, a form may comprise one or more character images within the content data, wherein the character image may contain handwritten font 110. In some embodiments, the character image may comprise type font content 120, 130, 140. In some implementations, character images of handwritten font 110 and type font 120, 130, 140 may be transformed into uniform type font 150. In some embodiments, the uniform type font 150 may be more easily readable by one or both a human and a computer. In some aspects, the uniform type font 150 may comprise type fonts specially designed for OCR. In some embodiments, the uniform type font 150 may comprise type fonts specially designed for the human eye.

Referring now to FIG. 2, a set of exemplary font transformations are illustrated. In some embodiments, a form may comprise a character image, wherein the character image may contain names in handwritten font 210, 220, 230. In some aspects, the handwritten font 210, 220, 230 may be transformed into a uniform type font 215, 225, 235. In some implementations, the uniform type font 215, 225, 235 may be suitable for ease of reading, which may be useful for forms that may be read by humans. In some embodiments, the uniform font 215, 225, 235 may be more easily readable by OCR.

In some aspects, the uniform type font 215. 225. 235 may be placed in a standard and more legible location within the form, wherein the location may increase the accuracy of character recognition. For example, some character recognition systems may only recognize characters within a predefined content map within a form. In some aspects, the translation of the uniform type font 215, 225, 235 may occur separately from the transformation of the handwritten font 210, 220, 230 to the uniform type font 215, 225, 235.

In some embodiments, a form may comprise character images with different types of handwritten font, which may occur if different users may add content to the form. In some aspects, the system may process each character image separately, wherein the element analysis for each character image may be independent, which may allow for unique font transformations each character image. For example, a form may comprise character images with all separated capital lettering, all separated lowercase lettering and a mixture of continuous and separated lettering. As another example, different handwritten fonts may include different displays of lettering, which may be due to personal preferences, regional teachings, or occupational background, as non-limiting examples.

Referring now to FIG. 3, a set of exemplary font transformations are illustrated. In some embodiments, content data within a form may comprise one or more character images, wherein the character images may comprise dates in handwritten font 310, 320, 330, 340. In some aspects, the handwritten font 310, 320, 330, 340 may be transformed into a uniform type font 315, 325, 335, 345. In some embodiments, the background data of a form 300 may be utilized to define content categories, which may be useful as context.

In some embodiments, content data may be categorized into alphabetic text, numeric text, and alphanumeric text. In some embodiments, categorization may identify or distinguish between fields or field types. In some aspects, identifying the types of text for each field of the form may allow for more accurate font transformation. In some implementations, content data may be categorized by input field, such as address, name, birthdate, or phone number, as non-limiting examples. In some embodiments, identifying input fields may allow for generation of more realistic synthetic data than synthetic data generated based on text types.

In some aspects, identifying that a field contains alphanumeric text may not suggest a format. Many fields may contain both letters and numbers, such as addresses, codes, birthdates, as non-limiting examples. Further categorization by input field may allow for more accurate font transformation. In some aspects, certain categories of data may be more effectively processed or recognized if done separately by unique artificial entities. For example, hand-written content and machine print content may be better processed separately, as recognition software may be handwriting or type specific. In some implementations, categorization of content data may create separable layers, wherein separation of layers may allow for separate processing and recognition.

For example, where a form may not explicitly force a particular format for a birthdate, users may input a birthdate in a range of formats. Formats may include "Month Day, Year," "MM/DD/YY," "MMDDYY." For example, if a birthdate field is interpreted as only containing numbers, versions with both letters and numbers may be misread or excluded. Similarly, if a field is interpreted as only containing numbers, the synthetic data for that field may only contain numbers, which may affect the accuracy of the training data.

Referring now to FIGS. 4A-4B, an exemplary font transformation is illustrated. In some aspects, content data in a form 400 may comprise multiple character images, wherein the character images may contain handwritten font 410, 420. In some embodiments, the handwritten font 410, 420 in the character image may be transformed into a uniform type font 415, 425. In some implementations, background data may provide context and may be used to distinguish between similar images. For example, context may distinguish between an "x" in "Xavier" and an "x" used to check a box, wherein the two x's may be similar images.

Referring now to FIGS. 5A-5B, an exemplary font transformation is illustrated. In some implementations, content data from a form 500 may comprise character images containing handwritten font 510, 520, 530. In some aspects, the handwritten font 510, 520, 530 in the character image may be transformed into a uniform font 515, 525, 535. In some embodiments, background data may provide context and may be used to distinguish between similar images.

In some implementations, the background data may identify categories of content data, wherein the categories may create expected content parameters. The content parameters may determine how a character image may be analyzed. For example, an "ll" in Ellen 510 may appear similar to "11" in the birthdate 530. As another example, "oo" in Smoot 520 may be similar to how one may write an "8" in the birthdate.

Referring now to FIG. 6, an exemplary form enhancement process is illustrated. In some aspects, a form may comprise background data and content data, wherein the background data may be identified and grouped as a mask that may be removed and added throughout the process. In some embodiments, removal of the mask may drop out the background data leaving the content data in isolation. In some implementations, during reassembly, the content data may be replaced in the same location as it was in the original form. In some embodiments, the content data may be translated, wherein at least a portion of the elements of content data may be shifted along one or both the x axis and the y axis. In some aspects, noise may be removed from the content data. In some implementations, specific aspects may be identified to form part of the mask.

In some aspects, a form may be received with poorly transmitted data, wherein the form may comprise noise, content data overlapping with background data, and skewed, as non-limiting examples. In some embodiments, a poorly transmitted form at 610 may be processed, wherein the elements of one or both the content data and the background data may be identified. In some implementations, the content data may be translated wherein the character image may be shifted into a correct location at 630 within the form. In some aspects, the translation may place the content data in service lines within the form. Shifting the content data into a correct location may increase the readability of the form for one or more humans, ICR, or OCR.

OCR/ICR systems may have templates that are used to tell the system where each of the fields is located. For example, there may be a map for a form that may prompt the OCR/ICR tool to start looking at coordinates to look for the field of type 'YEAR'. In some aspects, OCR/ICR pipelines may have issues with this approach due to the sensitivity to the data entry being within the predefined templates window for each field.

A typical OCR/ICR pipeline may likely fail to extract meaningful text from the pre-processed character image. In some embodiments, the system may create a translated character image, wherein the content data may be repositioned into the proper locations, which may fit into the OCR/ICR templates to allow the OCR/ICR to run properly.

In some embodiments, noise may comprise a zoomed in or out copy of a form, such as a section enlargement or a portion of a document. In some aspects, noise may comprise a changed aspect ratio of the form. In some embodiments, noise may comprise random elements within the form, such as black elements, grayscale, color variety, or combinations thereof, as non-limiting examples. In some implementations, noise may comprise a dilated synthetic form, eroded synthetic form, or combinations thereof.

In some aspects, the processing may analyze a character image by element, wherein the analysis may determine whether a element is noise or part of the background data or content data. In some embodiments, the analysis may determine whether the element is in the correct location or state, which may not be true if the element is in a skewed, deformed, distorted, or translated portion of the form, as non-limiting examples. In some implementations, where the element is determined to be part of the background data or content data, the system may leave the element in the character image. The element may be left in the same position and state, if it is in the correct location or state, or may be adjusted to the correct location and state. Where the element may be deemed noise, the system may remove all or part of the element.

In some implementations, the content data may be placed within the OCR/ICR tool's predefined template map. In some embodiments, the processed character image at 650, 670 may have more legible content data than the original character image. For example, inpainting may create character images with continuous lines allowing for increased legibility for one or both content data and background data. In some embodiments, the processed character image may be analyzed, wherein the analysis may allow one or both handwritten font and type font to be transformed into a uniform type font. In some aspects, the uniform type font within the character image may be analyzed with an OCR/ICR tool. Prior to the translation, OCR/ICR engines and corresponding claim maps may miss the content data.

Referring now to FIGS. 7A-7B, an exemplary font transformation is illustrated. In some aspects, a character image in a form may comprise a handwritten font name 710, which may contain continuous cursive lettering. In some implementations, a character image in a form may comprise a handwritten font checked box 740. In some embodiments, a character image in a form may comprise a handwritten font date 760. In some aspects, a character image in a form may comprise handwritten font address number 720 and handwritten font street name 730, wherein the first letter and number may be written separately and the remaining portion of the handwritten font street name 730 may be written as continuous cursive. In some embodiments, a character image in a form may comprise a type font location 750. In some embodiments, a character image in a form may comprise a type font phone number 770.

In some embodiments, a character image may comprise content data that may not be properly aligned and may overlap with the background data, which may limit the ability of OCR/ICR tools to recognize the content data as text. For example, a manual typewriter or document editor with manually inserted content may be used to input the type font location 750 and type font phone number 770. The manual alignment may be incorrect, such as too high, too low, or too far from the intended category. In some aspects, the character images may be translated into a correct position, which may allow for a more accurate font transformation.

In some aspects, handwritten font may appear similar, such as the handwritten font checked box 740 and the "V" in the handwritten font street name 730. As another example, a handwritten font date 760 may appear similar to a handwritten font address number 720. In some embodiments, processing the background date to identify content categories may provide sufficient context to distinguish between similar character images.

In some implementations, the character images may be transformed into processed form 780, wherein content character images may be transformed into a uniform type font. In some embodiments, the transformation may place the character images in a standard format, such as a uniform date and phone number configuration that may be easily read by OCR or where the OCR software may be programmed to easily recognize. As another example, the transformation may transform all text into capital lettering.

Figure 8:
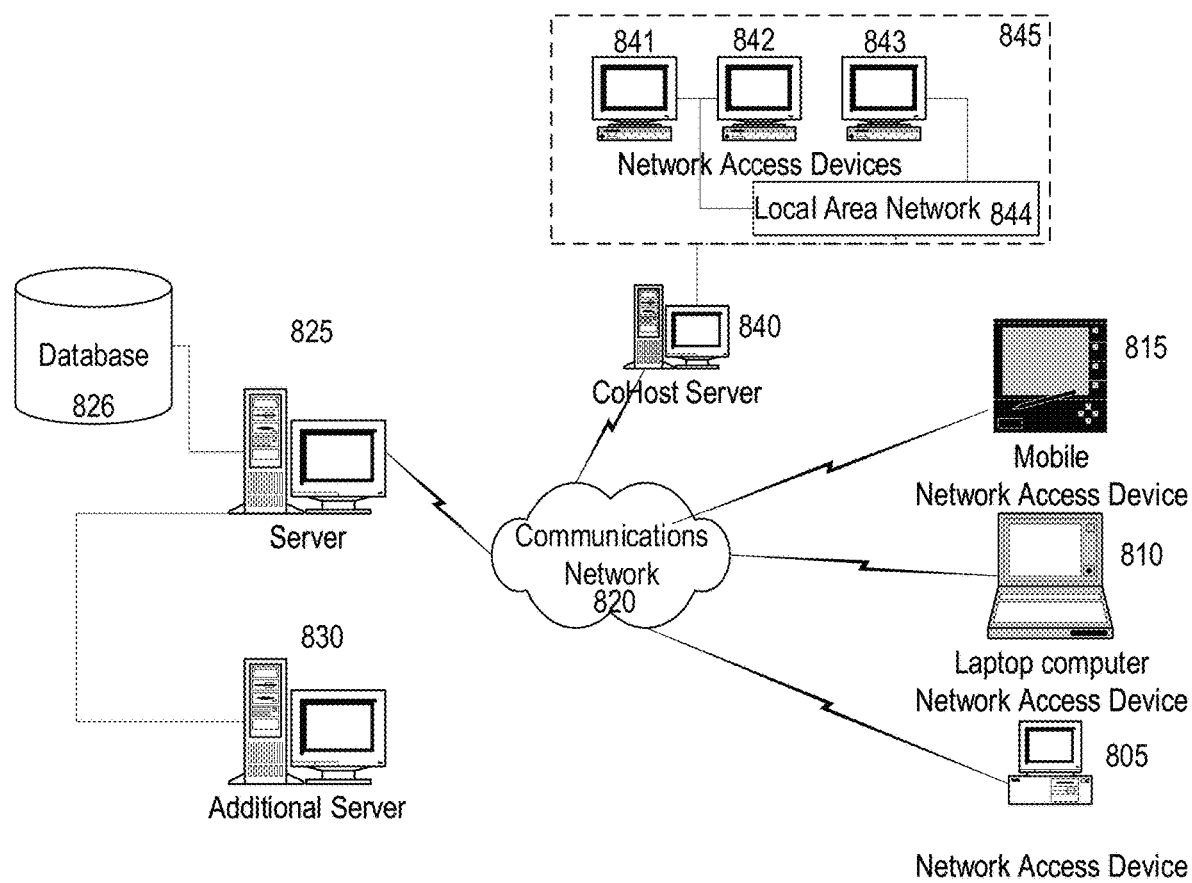
FIG. 8 illustrates an exemplary processing and interface system.

Referring now to FIG. 8, an exemplary processing and interface system 800 is illustrated. In some aspects, access devices 815, 810, 805, such as a paired portable device 815 or laptop computer 810 may be able to communicate with an external server 825 through a communications network 820. The external server 825 may be in logical communication with a database 826, which may comprise data related to identification information and associated profile information. In some embodiments, the server 825 may be in logical communication with an additional server 830, which may comprise supplemental processing capabilities.

In some aspects, the server 825 and access devices 805, 810, 815 may be able to communicate with a cohost server 840 through a communications network 820. The cohost server 840 may be in logical communication with an internal network 845 comprising network access devices 841, 842, 843 and a local area network 844.

In some aspects, training data may be stored in the database 826, wherein the training data may be utilized in an algorithm-based model system, such as through the external server 825, wherein the machine learning system may produce a goal output. In some embodiments, a set of training data may be utilized to produce multiple goal outputs. Different goal outputs may allow for a range of uses for the same set of training data. For example, an entity may want different goal outputs for different uses. As another example, different entities may want different goal outputs.

In some embodiments, the system may utilize machine learning. As other examples, the algorithm model may comprise generalized linear models, support vector machines, nearest neighbor, decision trees, boosted or bagged decision trees, ensemble methods, Boltzmann machines, auto encoders, or neural networks. In some aspects, the system may utilize a combination of algorithm models.

Figure 9:
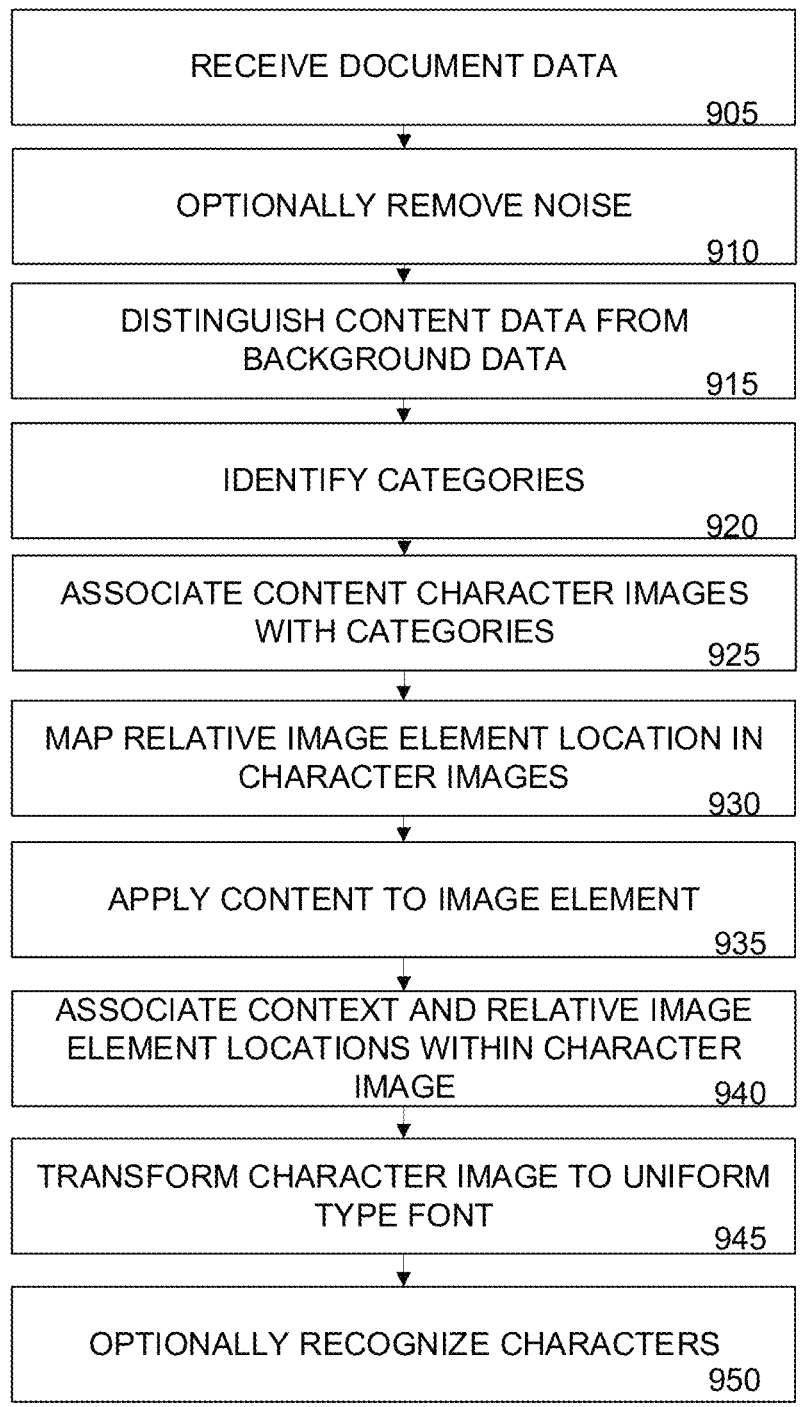
FIG. 9 illustrates exemplary process steps for transforming fonts or characters.

Referring now to FIG. 9, exemplary process steps for transforming fonts or characters are illustrated. At 905, document data may be received. In some aspects, at 910, noise may be removed, such as described and illustrated in FIG. 6. At 915, content data may be distinguished from background data. At 920, categories within the background may be identified. At 925, elements within content character images may be associated with each category. At 930, relative element locations in each character image may be mapped. At 935, context of categories may be applied to the elements. At 940, relative element locations and context may be associated with a character image, wherein the character image may comprise a handwritten or typed font. At 945, the character image may be transformed to a transformed font, wherein the transformed font may comprise a uniform type font. In some embodiments, at 950, characters within the transformed character image may be recognized.

In some embodiments, a user or secondary system may verify whether the transformed character image is similar to the original character image. In some implementations, the system may be considered accurate after a verification analysis threshold is reached with training data. In some aspects, one or both users and a secondary system may test the system's capability to produce accurate or similar transformed character images before the system moves beyond training data. In some embodiments, a user may eliminate historical data that may affect or skew how character images may be transformed. In some implementations, one or both a user or secondary system may review or tweak synthetic data after the system creates a model.

For example, a secondary system may randomly select a sample of character images to process potential accuracy of a transformed character image. The analysis may occur after the character image may be processed for removal of noise, translation to a correct position, and adjustments from skewing. The analysis may include processing the corrected character image and the transformed character image with OCR/ICR technology and comparing the results. A discrepancy between the results may be expected due to the typical margin of error associated with the OCR/ICR technology, and a threshold level of accuracy may be considered acceptable. The actual similarity may be higher.

In some embodiments, masks may be developed for at least a portion of a form, wherein the mask may comprise one or more background data and content data. For example, a background data mask may be used as a base for a form. Utilizing a mask may allow for more efficient separation and identification of character images with content data.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A process for processing character images within a form, the process comprising:
    receiving a form with data;
    analyzing the form and data through an artificial entity;
    identifying a plurality of character image elements within the data without requiring recognition of character images comprising the plurality of character image elements; and
    transforming at least a portion of the plurality of character image elements without requiring recognition of character images comprising the plurality of character image elements.

2. The process of claim 1, further comprising inpainting missing character image elements, wherein the inpainting increases a legibility of a character image comprising at least a portion of missing character image elements.

3. The process of claim 1, further comprising identifying at least a portion of the plurality of character image elements as one or more of content data, background data, and noise.

4. The process of claim 3, further comprising mapping relative locations of each of the plurality of character image elements within the form.

5. The process of claim 4, further comprising identifying correct relative locations of content data and background data, wherein correct relative locations of content data and background data increase effectiveness of recognition.

6. The process of claim 4, further comprising translating at least a portion of the plurality of character image elements.

7. The process of claim 6, wherein the translating comprises shifting at least a portion of the plurality of character image elements to correct relative locations within the form.

8. The process of claim 4, further comprising:
    removing content data from the form; and
    repopulating the content data with transformed character image elements.

9. The process of claim 1, wherein a plurality of character images comprises one or both a handwritten font or a typed font, wherein the plurality of character images comprises at least a portion of the character image elements.

10. The process of claim 9, further comprising identifying handwritten font and typed font.

11. The process of claim 10, wherein the identifying creates separable layers that, when separate, allows for increased recognition of at least a portion of one or both background data and content data.

12. The process of claim 1, wherein transforming changes at least a portion of the plurality of character image elements to one or more predefined transformed fonts.

13. The process of claim 12, wherein one or more predefined transformed fonts increase accuracy of character recognition.

14. A process for processing character images within a form, the process comprising:
    receiving a form with data;
    analyzing the form and data through an artificial entity;
    identifying a plurality of character image elements within the data without requiring recognition of character images comprising the plurality of character image elements; and
    translating at least a portion of the plurality of character image elements without requiring recognition of character images comprising the plurality of character image elements, wherein translating maps relative locations of each of the plurality of character image elements within the form.

15. The process of claim 14, further comprising identifying at least a portion of the plurality of character image elements as content data, background data, or both.

16. The process of claim 15, wherein translating identifies correct relative locations of content data and background data, wherein correct relative locations of content data and background data increase effectiveness of recognition.

17. The process of claim 14, wherein translating shifts at least a portion of the plurality of character image elements to correct relative locations within the form.

18. The process of claim 15, further comprising:
    removing content data from the form; and
    repopulating the content data with translated character image elements.

19. The process of claim 15, further comprising transforming at least a portion of the plurality of character image elements.

* * * * *